Patented Oct. 19, 1954

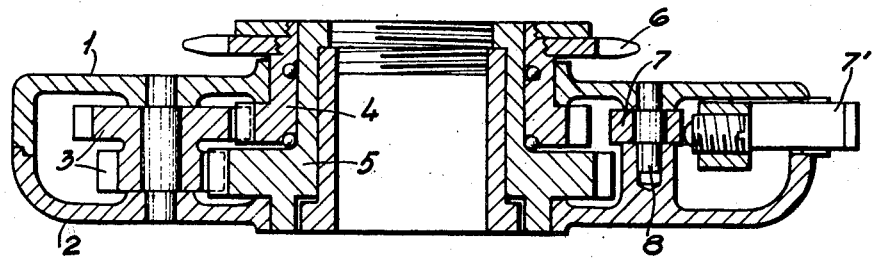
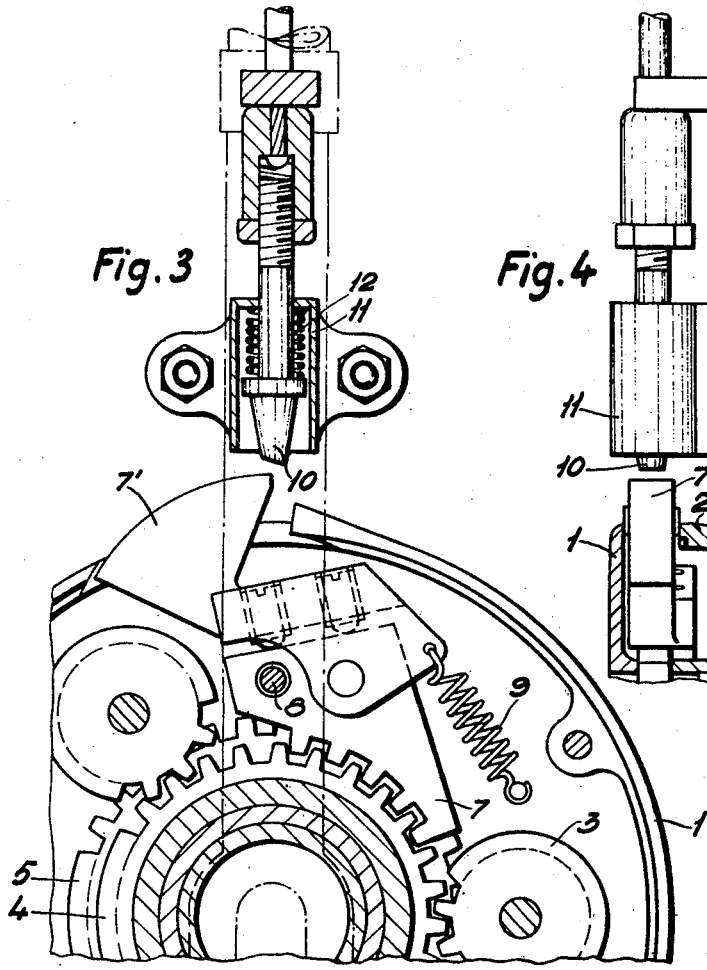
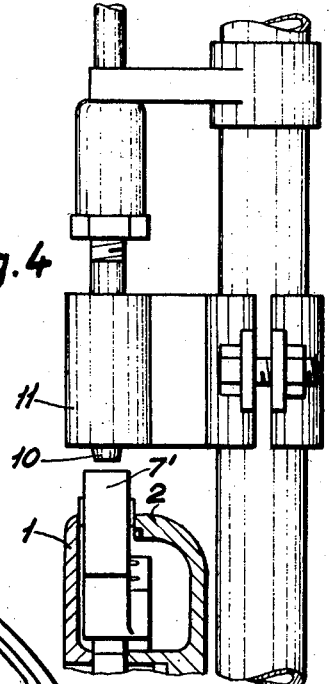

2,691,904

UNITED STATES PATENT OFFICE 2,691,904

CHANGE-OVER DEVICE FOR BICYCLE GEARS

Carl Silvander, Stockholm, Sweden

Application September 13, 1950, Serial No. 186,069

Claims priority, application Denmark October 16, 1947

4 Claims. (Cl. 74—789)

1

The present invention relates to an epicyclic gear system and constitutes a change-over device for changing the drive ratio in bicycles and similar vehicles in which toothed wheels in accordance with planetary wheel gear systems are employed. The device has for its object to render the greatest possible simplicity, durability and reliability and can also provide, by reason of its compact design, such small axial dimensions that bicycle gears of this design can be easily mounted on already existing bicycles without reconstruction of the same by screwing the gear directly to the back wheel hub.

The device is illustrated in the accompanying drawings, in which the gear housing is presupposed to be the back wheel hub instead of the ordinary sprocket wheel.

Fig. 1 shows a gear wheel device according to the above-mentioned system, the front wall of the gear housing being removed, comprising the change-over device, viz. a pivoted pawl 7 which can be moved to engage the teeth of the sun wheel and a plunger 10 that is operable from the outside, which together form the change-over mechanism and are shown in a position for changed speed of the bicycle back wheel in relation to a chain wheel.

Fig. 2 shows the same gear as that of Fig. 1, viewed along a section line II—II in Fig. 1.

Fig. 3 shows the position of the parts of the change-over device when the sun wheels are mutually locked by the pivoted pawl 7 so that the whole gearing system is rigid and also released from the plunger 10 on the bicycle fork. In this position, the change-over mechanism is out of function and rotates clockwise at the same speed as that of the back wheel and the chain wheel.

Fig. 4 is the same gear as that shown in Fig. 3 in side view and partly in section.

Figure 1:
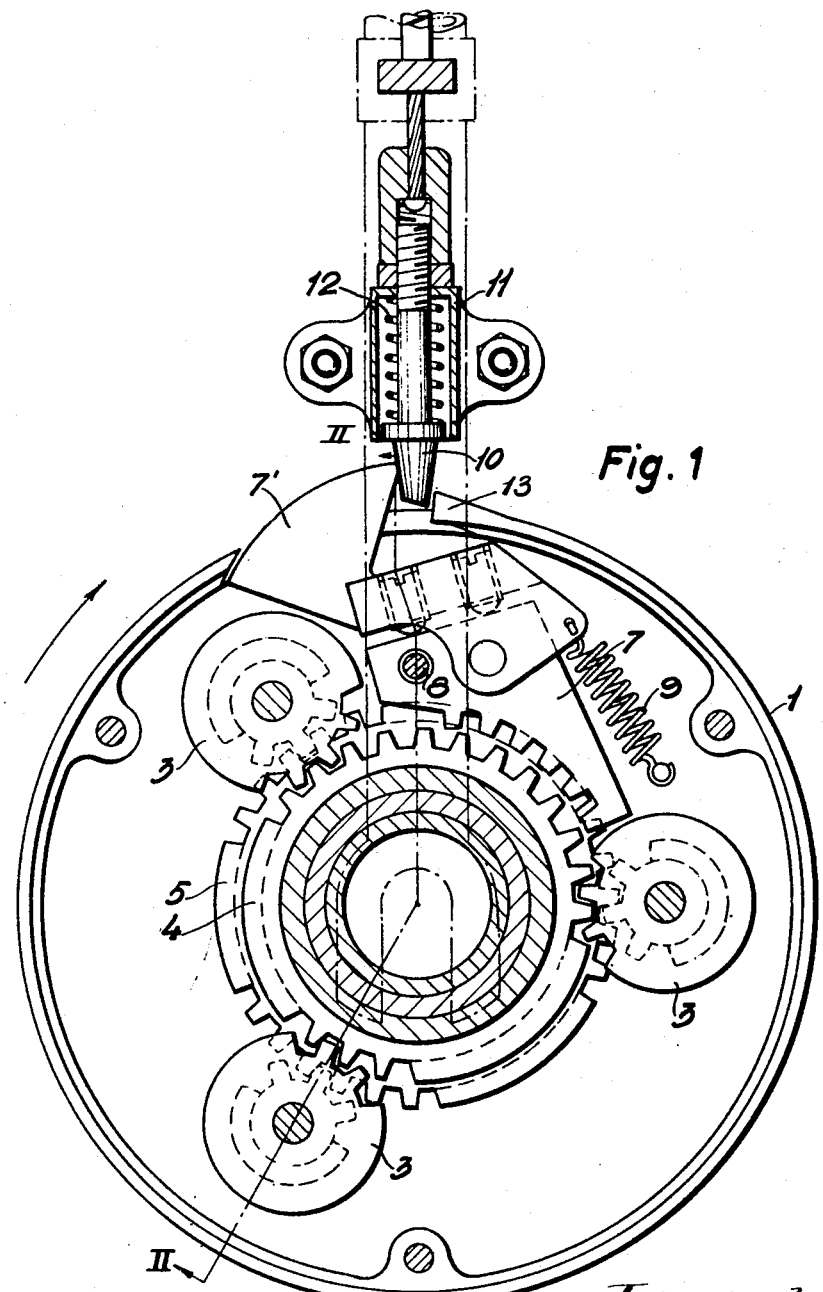

The invention consists substantially in a turnable pawl 7 and 7' carried by a pin fixed to the housing or the bearer of the gear wheel system, which pawl is to be turned for direct engagement of one or more teeth on a sunwheel or alternatively releasing the same, in order either to lock the gear to the said housing or let the gears be free of the same, whereby the gears will be either active or idle. Further it consists of a plunger 10 with a tapered point for bringing about the changeover described below. The invention is further characterized in dividing the pawl into two parts to compensate for wear, if any, of the points of the pawl teeth by mutual adjustment of these parts in relation to each other.

2

As shown in the drawings, applicant's device comprises a driving sun gear 4 and a driven sun gear 5, said sun gears being in mesh with double integral planetary gears 3 which are rotatable on pins carried by the housing or carrier 1, 2, and a pawl 7 pivoted on a pin 8 which is carried by the housing 1, 2. Said pawl 7 normally engages the sun gear 4 to lock it to the housing. Under such normal condition, drive through sun gear 4 would be directly communicated to the housing via the pawl 7, and as a result thereof the sun gear 5 would be drive directly since there would be no relative motion between the sun gears 4 and 5. When the plunger 10 is released to lock the housing 1, 2 and disengage the pawl 7 from the sun gear 4, the housing being stationary, the gears 3 act as a simple compound gear train to transmit drive from gear 4 to gear 5.

Referring now more particularly to the drawings, the numerals 1 and 2 designate walls of the gear housing which forms a carrier for the planetary gears 3 journaled therein. The gear housing is supported by the projecting hubs of the sun wheels 4 and 5. According to the drawing, the sun wheel 4 is built together with the chain wheel 6, while the other sun wheel 5 is screwed to the back wheel hub or to the freewheel hub in case such is used. The pawl 7 is pivotally journalled on a shaft 8, which is secured to the gear housing. The pawl 7 is provided with an extended nose 7', which projects out of the gear housing and is operated by the sliding plunger 10. The said pawl 7 may be integral with said nose 7' or, as shown in the drawing, it may consist of two parts which are screwed together and are adjustable relatively to each other to allow adjustment as the peaks of the ratchet teeth are worn. By a spring 9 the pawl is biased into engagement with the sun wheel 4, thus locking the same when in normal position. The plunger 10 which is slidable in a sleeve 11 on the rear fork, is controlled by a Bowden cable or the like which, when tightened, pulls out the plunger for normal operation but, when released, allows the plunger to be forced radially inwards by a spring 12, whereby said plunger 10, when the housing is rotating clockwise, releases the pawl 7 from the engagement with sunwheel 4 and also retains the gear housing so that the latter is prevented from rotating. This is so effected, that at first the gear housing continues its rotation until the nose 7' strikes against the plunger 10 and turns the pawl 7 so that the sun wheel 4 is released simultaneously with the plunger 10 entering in between the nose 7' and a rigid abutment 13 provided on the gear housing, thus retaining the gear housing. The rigid abutment 13 is designed with an inclined plane so that the plunger 10 can glide easily upwards and over the same, the plunger first pushing away the nose 7' a distance corresponding to the width of the plunger's point. However, in this position the pawl has not completely released the sun wheel 4. This action is accomplished by further radial movement of the plunger 10 the wider, inner portion of the plunger 10 driving the nose 7' further so that the pawl 7 is completely released.

If it be assumed that (1) power is supplied by the back wheel, by the momentum of the bicycle, as when coasting, and no power is coming from the chain wheel, and (2) the back wheel is rotating less rapidly than the chain wheel, it follows that (A) the pawl must be disengaged, and (B) the gear housing would turn counter-clockwise unless prevented by the plunger bearing against the abutment. Therefore, it is important that the gear housing be retained by the plunger 10 against the abutment 13, before the sun wheel 4 is engaged by the pawl 7 for the change-over to normal operation, because if the gear housing should be turning counter-clockwise then the pawl 7 if engaged with the sun wheel 4 would cause a severe shock to the mechanism by complete reversal of motion of the gear housing. It will appear from this also that the rigid abutment 13 is necessary for absorbing the reaction pressure from the teeth of the smaller planetary gears 3 and their pins in the gear housing when the gears 3 are transmitting movement (Fig. 1). To effect this successive disengagement of the pawl 7, I have made the plunger 10 wider at its base than at its point, whereby during its continued insertion between the nose 7' and the abutment 13 it will turn the pawl 7 somewhat more for the release of the pawl 7 from the sun wheel 4.

The functioning is as follows:

When it is desired to change the normal, i. e. the non-changed-over ratio between chain wheel and back wheel, the retaining Bowden cable is slackened, whereby the plunger 10 moves radially inwards, strikes against the rotating nose 7', and prevents nose 7' from rotating with the gear housing. As the gear housing continues to rotate, the nose 7' rocks the pawl 7 so that the pawl 7 is released from the sun gear 4, and simultaneously the plunger 10 is forced by its spring 12 between the nose 7' and the abutment 13 to such a distance that the width of the inner end of the plunger 10 holds the pawl disengaged and any movement of the gear housing is prevented. Now the gears 3 function. When driving without gears 3 is to take place again, the plunger 10 is pulled outwards by means of the Bowden cable, whereby the gear housing is released for rotation, and similtaneously the pawl 7 locks the gear 4 so that gears 4 and 5 form a rigid system for unitary rotation.

Having now described my invention, what I claim as new and desire to secure by Letter Patent is:

1. A clutch-brake mechanism for use with a change-speed device, for bicycles or similar vehicles, having a driving wheel, a driven wheel and driving means for connecting said wheels, said mechanism having a housing surrounding the change-speed device and rotatable relative to the driving and driven wheels, a pawl pivoted in said housing and normally engaging the driving wheel to rotate said housing for one speed driving, said pawl having a nose extending out of said housing, a plunger slidably mounted adjacent said housing, and means to move said plunger into the path of movement of said nose to disengage said pawl, and to stop rotation of said housing for a second speed driving.

2. A mechanism, according to claim 1, for use with a change-speed device having a driving gear, and in which said pawl is provided with a plurality of teeth adapted to engage a plurality of the teeth of said driving gear.

3. A mechansim, according to claim 1, in which said housing has an abutment, and said plunger has a tapered end inserted between said nose and said abutment.

4. A mechanism, according to claim 1, in which said nose is adjustably mounted on said pawl.

References Cited in the file of this patent

UNITED STATES PATENTS

| Number | Name | Date |
|---|---|---|
| 246,988 | Venner | Sept. 13, 1881 |
| 572,828 | Redding | Dec. 8, 1896 |
| 1,140,374 | Hanson | May 25, 1915 |

FOREIGN PATENTS

| Number | Country | Date |
|---|---|---|
| 26,637 | Great Britain | Nov. 6, 1913 |
| 100,679 | Germany | Dec. 30, 1898 |
| 103,237 | Germany | June 8, 1899 |
| 296,090 | France | Jan. 12, 1900 |
| 459,339 | Great Britain | Jan. 6, 1937 |
| 466,492 | Canada | July 11, 1950 |
| 533,770 | Great Britain | Feb. 19, 1941 |